Patented May 17, 1949

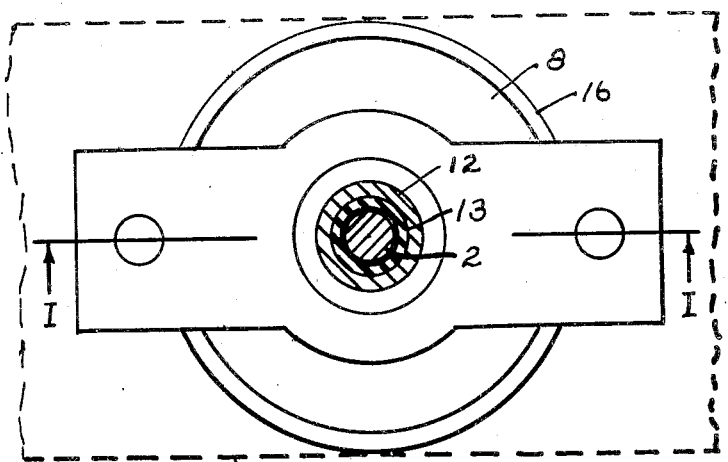
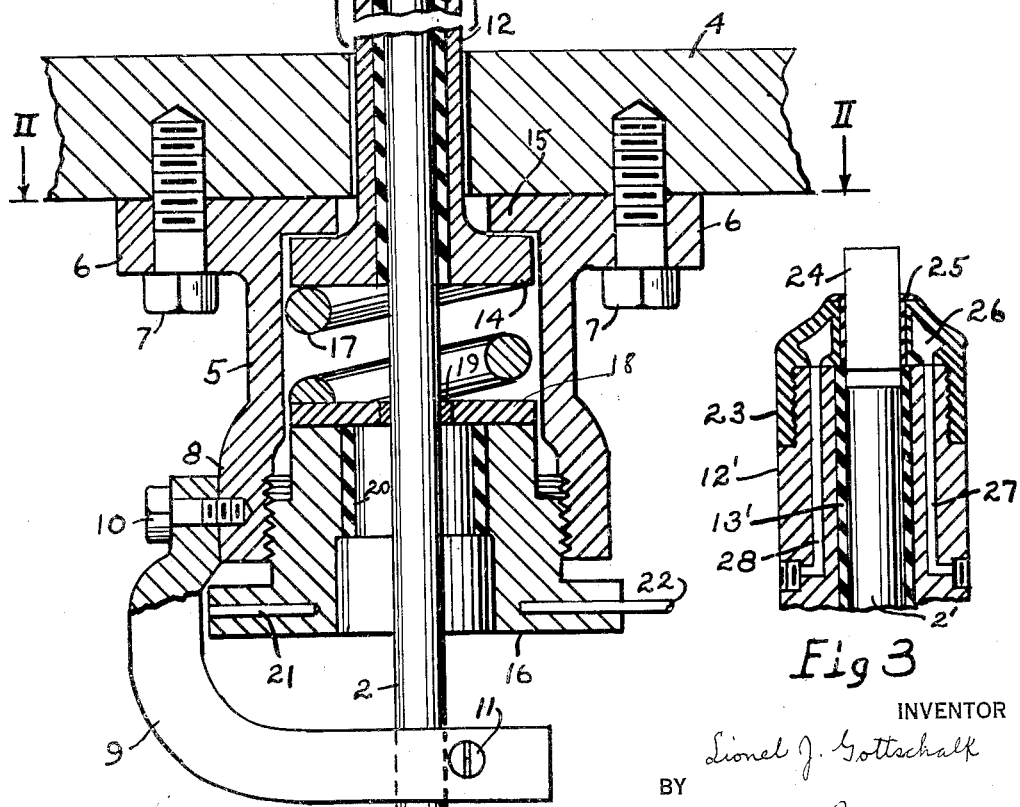

2,470,552

UNITED STATES PATENT OFFICE 2,470,552

ELECTRIC WELDING MACHINE

Lionel J. Gottschalk, New Orleans, La.

Application February 28, 1945, Serial No. 580,130

6 Claims. (Cl. 219—4)

My invention relates to electric welding machines. In electric pressure welding, the material which is to be welded must be subjected to pressure at the moment that the heating current passes through the two pieces which are to be welded. In order to obtain a good weld, it is desirable that a pre-determined pressure be applied and that this pressure come within a relatively small margin of the pressure which has been determined to be the most effective. If the pressure is lower than this range, the parts will not cohere sufficiently to make a good weld, while if higher, the surface of the material will be marred.

An object therefore of this invention is to embody in an electric welding machine a combination of elements consisting of a pressure applying electrode, an opposed fixed electrode, and resiliently urged means associated with the fixed electrode for effecting a recurrent pre-determined pressure when pressure is applied to the material as it is being welded between the electrodes. Another object is to provide means for adjusting or varying the pre-determined pressure. In carrying out this concept of invention, I have found the most effective construction is to provide a compression spring associated with the fixed electrode and means resiliently urged by the spring beyond the tip of the fixed electrode.

The novel features which I believe to be characteristic of this invention are set forth with particularity in the appended claims. The invention, however, both as to organization and method of operation, together with additional objects and advantages thereof, will be best understood from the following description of specific embodiments when read in connection with the accompanying drawing in which, Fig. 1 is a view in section on the line I—I of Fig. 2.

Fig. 2 is a view substantially in section on the line II—II of Fig. 1 with the outline of a machine arm shown in dash lines.

Fig. 3 is a view corresponding in general to Fig. 1, but showing a modified form of construction of parts adjacent to the tip of the fixed electrode.

Referring to the drawing, the numeral 1 designates a pressure applying electrode which may be operated by any convenient means or by any means well known in the art of electric welding and therefore not necessary to show since such means constitute no part of this invention. A fixed electrode 2 having a tip 3 is mounted in proper relation to the electrode 1. For illustrative purposes, the electrode 2 is shown below the electrode 1. It is obvious, however, that without changing the principle of this invention, the electrode 2 might be positioned above the electrode 1, and also that the two electrodes might be positioned horizontally. Also that they might be placed at any desired angle to the vertical or horizontal, provided they are kept in alinement with each other and with the proper spacing between their tips.

The numeral 4 designates the customary arm of a welding machine. A cylinder 5 is provided with flanges 6 for attachment to the arm 4 by means of screw bolts 7 passing through these flanges and into threaded holes in the arm. An end portion of the cylinder 5 is enlarged as indicated at 8. A curved member 9 is secured at one end to the enlargement 8 by one or more screw bolts 10. The electrode 2 is fixedly secured to the other end of the member 9 by a clamping bolt 11.

A sleeve 12 having an insulative lining 13 surrounds an end portion of the electrode 2 and projects up through an opening in the arm 4 beyond the electrode tip 3. The other end of the sleeve 12 is provided with an external flange 14 which not only fits slidably in the bore of the cylinder 5 but is adapted to engage an internal stop flange 15 formed at the end of the cylinder 5. A spindle-like member 16 has external threads engaged with internal threads of the enlargement 8. A spring 17 is interposed between the flange 14 and a disk 18 placed at the inner end of 16. The disk 18 has an insulated lining 19 around the electrode 2 while the member 16 is provided with an insulative lining 20. Opposite the disk 18 the member 16 has an external flange which is shown with holes 21 drilled into its periphery. This member 16 may be screwed more or less into the enlargement 8 by turning it either in the hand or by means of a rod 22 inserted into one of the holes 21. It is obvious therefore that adjustment may be made to increase and decrease the force exerted by the spring 17 and to provide for work having different characteristics.

In the modified construction of Fig. 3, parts of the device which are the same as those in Fig. 1 are not duplicated. The fixed electrode member 2' is secured in the same manner while the sleeve 12' is resiliently urged in the same manner as previously described. However, as shown in Fig. 3, a thimble or cap 23 is screwed to the end of the sleeve 12' having insulative lining 13'. A rod-like member 24, which serves as a movable extension for the fixed electrode member 2', is securely fastened to the thimble 23 and is surrounded by insulation 25. A chamber 26 is located between this insulation and the thimble 23. Passageways 27 and 28 lead into and out of the chamber 26 for providing circulation of cooling liquid.

The operation and advantages of my invention will be obvious in connection with the foregoing description and the accompanying drawing. When the pressure applying electrode 1 is advanced to bring it into contact with one side of the material to be welded, the sleeve 12 is retracted in opposition to the force exerted by the spring 17 until the other side of the material comes into contact with the tip of the fixed electrode 2. The result is that a pre-determined pressure, which must be of sufficient force to overcome the resistance of the spring 17 by depressing the sleeve 12 is applied to the material as it is being welded between the electrodes. For successive welding operations, the pre-determined pressure is recurrently applied unless changed for work of different character. By turning the spindle member 16 in or out with relation to the enlarged portion of the cylinder 5, the pre-determined pressure may be readily adjusted or varied to make it such as has been determined to be the most effective for the particular material.

In regard to the modification shown in Fig. 3, when the pressure applying electrode is advanced to bring it into contact with one side of the material to be welded, the sleeve 12' carrying with it the rod member 24 is retracted in opposition to the force exerted by the spring until the member 24 comes into contact with the tip of the fixed electrode member 2'. This action causes the pre-determined pressure to be applied for welding while the circulating liquid cools the member 24 and the thimble 23.

I claim:

1. In an electric welding machine, the combination of a pressure applying electrode member, a fixed electrode member in alinement therewith, a movable non-current conducting member in spaced relation to said fixed electrode member, and a resilient member tending to urge said movable member forwardly whereby the work is subjected to predetermined pressure when a circuit is established through the work upon forward movement of said pressure applying electrode.

2. In an electric welding machine, the combination of a pressure applying electrode, a fixed electrode in alinement therewith, a slidably mounted sleeve surrounding said fixed electrode and insulated therefrom, and a spring engaging the rear end of said sleeve for urging its forward end beyond the tip of said fixed electrode whereby the work is subjected to predetermined pressure when a circuit is established through the work upon forward movement of the first mentioned electrode.

3. In an electric welding machine, the combination of a pressure applying electrode, a fixed electrode in alinement therewith, a sleeve surrounding said fixed electrode and insulated therefrom, the rear end of said sleeve having an external flange, a cylinder in which said flange is adapted to slide, an annular member mounted in said cylinder and spaced from said flange, and a spring interposed between said member and said flange tending to urge the forward end of said sleeve beyond the tip of said fixed electrode.

4. In an electric welding machine having an arm, the combination of a pressure applying electrode, a cylinder secured to said arm, a curved member attached to said cylinder, an electrode fixedly secured to said curved member, a sleeve insulatively surrounding said fixed electrode and extending through an opening in said arm, an external flange on the rear end of said sleeve adapted to slide in said cylinder, an annular member adjustably mounted in said cylinder and spaced from said flange, a spring interposed between said annular member and said flange tending to urge the forward end of said sleeve beyond the tip of said fixed electrode, and an internal stop flange in said cylinder adapted to be engaged by said first mentioned flange.

5. In an electric welding machine, the combination of a pressure applying electrode, a fixed electrode member in alinement therewith, a slidably mounted sleeve insulatively surrounding said fixed electrode member, a spring engaging the rear end of said sleeve for urging its forward end beyond the tip of said fixed electrode member, and a rod insulatively secured to the forward end of said sleeve to serve as an extension of said fixed electrode member when said sleeve is in retracted position.

6. In an electric welding machine, the combination of a pressure applying electrode, a fixed electrode member in alinement therewith, a slidably mounted sleeve insulatively surrounding said fixed electrode member, a spring engaging the rear end of said sleeve for urging its forward end beyond the tip of said fixed electrode member, a thimble secured to the projecting end of said sleeve, and a rod insulatively secured to said thimble to serve as an extension of said fixed electrode member when said sleeve is in retracted position.

LIONEL J. GOTTSCHALK.

REFERENCES CITED

The following references are of record in the file of this patent:

UNITED STATES PATENTS

| Number | Name | Date |
|---|---|---|
| 896,218 | Lachman | Aug. 18, 1908 |
| 1,344,415 | Longacre | June 22, 1920 |
| 1,670,699 | Weed | May 22, 1928 |
| 2,045,523 | Fassler | June 23, 1936 |
| 2,272,968 | Dyer | Feb. 10, 1942 |
| 2,370,009 | Clark et al. | Feb. 20, 1945 |

FOREIGN PATENTS

| Number | Country | Date |
|---|---|---|
| 458,197 | Great Britain | Dec. 15, 1936 |